US011489396B2

(12) United States Patent
Marjomaa et al.

(10) Patent No.: US 11,489,396 B2
(45) Date of Patent: Nov. 1, 2022

(54) WINDING RETENTION INSERT FOR A BRUSHLESS MOTOR

(71) Applicant: Black & Decker Inc., New Britain, CT (US)

(72) Inventors: Michael R. Marjomaa, Mount Wolfe, PA (US); John B. Fogle, White Hall, MD (US); Kevin L. Pulley, White Marsh, MD (US); David J. Smith, Columbia, MD (US)

(73) Assignee: Black 7 Decker Inc., New Britain, CT (US)

( * ) Notice: Subject to any disclaimer, the term of this patent is extended or adjusted under 35 U.S.C. 154(b) by 115 days.

(21) Appl. No.: 16/678,209

(22) Filed: Nov. 8, 2019

(65) Prior Publication Data

US 2020/0161927 A1 May 21, 2020

Related U.S. Application Data

(60) Provisional application No. 62/767,733, filed on Nov. 15, 2018.

(51) Int. Cl.
*H02K 3/52* (2006.01)
*H02K 7/14* (2006.01)
(Continued)

(52) U.S. Cl.
CPC ............ *H02K 3/522* (2013.01); *B25F 5/006* (2013.01); *H02K 7/145* (2013.01); *H02K 21/222* (2013.01);
(Continued)

(58) Field of Classification Search
CPC .. H02K 3/00; H02K 3/18; H02K 3/34; H02K 3/345; H02K 3/46; H02K 3/48;
(Continued)

(56) References Cited

U.S. PATENT DOCUMENTS 2,232,773 A 2/1941 Daiger
3,008,786 A 11/1961 Costello
(Continued)

FOREIGN PATENT DOCUMENTS

CN 1135153 C 1/2004
CN 202363995 U 8/2012
(Continued)

OTHER PUBLICATIONS

EP EESR, dated Mar. 25, 2020 in corresponding EP application 19207806.1.
(Continued)

*Primary Examiner* — Tran N Nguyen
(74) *Attorney, Agent, or Firm* — Amir R. Rohani (57) ABSTRACT

A brushless motor is provided including a rotor rotating around a center axis and a stator including a stator core and stator teeth radially extending from the stator core forming stator slots therebetween. Each stator tooth includes a radial main body and a tooth tip extending substantially laterally from an end of the radial main body opposite the stator core, and stator windings are wound around the stator teeth. Winding retention wedges are axially received within the slots, each winding retention wedge comprising: a first portion received within gaps formed between tooth tips of adjacent stator teeth, and a second portion received at least partially between adjacent stator windings to apply a force substantially in a range of a radially-inward direction to a lateral direction to the adjacent stator windings.

17 Claims, 5 Drawing Sheets

(51) Int. Cl.
*B25F 5/00* (2006.01)
*H02K 21/22* (2006.01)
*B25C 1/00* (2006.01)
*B25C 1/06* (2006.01)

(52) U.S. Cl.
CPC .............. *B25C 1/008* (2013.01); *B25C 1/06* (2013.01); *H02K 2203/06* (2013.01)

(58) Field of Classification Search
CPC .......... H02K 3/487; H02K 3/49; H02K 3/493; H02K 3/52; H02K 3/521; H02K 3/522; H02K 3/527; H02K 15/00
See application file for complete search history.

(56) References Cited

U.S. PATENT DOCUMENTS

| | | | |
|---|---|---|---|
| 4,015,156 A | 3/1977 | Johrde | |
| 4,228,375 A | 10/1980 | Beermann et al. | |
| 4,345,175 A | 8/1982 | Jones | |
| 4,380,713 A | 4/1983 | Roger et al. | |
| 5,498,916 A | 3/1996 | Lindner et al. | |
| 6,113,024 A | 9/2000 | Pittard et al. | |
| 6,661,133 B2 | 12/2003 | Liebermann | |
| 6,984,910 B2 | 1/2006 | Down et al. | |
| 7,541,714 B2 | 6/2009 | Parsania et al. | |
| 7,821,171 B2 | 10/2010 | Lemmers, Jr. et al. | |
| 9,479,022 B2 | 10/2016 | Hoemann et al. | |
| 9,601,961 B2 | 3/2017 | Lee et al. | |
| 9,614,406 B2 | 4/2017 | Johnson et al. | |
| 9,685,833 B2 | 6/2017 | Bulatow et al. | |
| 9,735,642 B2 | 8/2017 | Bulatow et al. | |
| 2003/0184180 A1* | 10/2003 | Doherty | H02K 3/527 310/214 |
| 2004/0124730 A1* | 7/2004 | Yamaguchi | H02K 15/0018 310/214 |
| 2010/0127592 A1 | 5/2010 | Yu et al. | |
| 2013/0207491 A1* | 8/2013 | Hatfield | H02K 11/30 310/50 |
| 2013/0270934 A1 | 10/2013 | Smith et al. | |
| 2017/0106521 A1 | 4/2017 | Kelleher et al. | |
| 2017/0106522 A1 | 4/2017 | Coates et al. | |
| 2017/0110946 A1 | 4/2017 | Oktavec et al. | |
| 2018/0034338 A1 | 2/2018 | Nagata et al. | |

FOREIGN PATENT DOCUMENTS

| | | |
|---|---|---|
| DE | 10244201 A1 | 4/2004 |
| DE | 10357987 A1 | 7/2004 |
| DE | 102011121793 A1 | 6/2013 |
| EP | 1208629 B1 | 4/2004 |
| EP | 2378628 A2 | 10/2011 |
| EP | 2449658 A1 | 5/2012 |
| EP | 2887512 A1 | 6/2015 |
| EP | 2918001 A2 | 9/2015 |
| EP | 2993763 A2 | 3/2016 |
| EP | 2458714 B1 | 3/2017 |
| EP | 2854256 B1 | 6/2017 |
| EP | 3163718 B1 | 9/2018 |
| GB | 654712 A | 6/1951 |
| GB | 2424314 B | 5/2008 |
| GB | 2503480 A | 1/2014 |
| GB | 2509735 A | 7/2014 |
| WO | 16180120 A1 | 11/2016 |

OTHER PUBLICATIONS

EP Communication Article 94(3), dated May 31, 2021 in corresponding EP application 19207806.1.

* cited by examiner

WINDING RETENTION INSERT FOR A BRUSHLESS MOTOR

RELATED APPLICATION

This utility patent application claims the benefit of U.S. Provisional Patent Application No. 62/767,733 filed Nov. 15, 2018.

FIELD

This application relates to power tool motor, and in particular to wedge used for improved retention of windings in a brushless direct-current (BLDC) motor in a power tool.

BACKGROUND

A brushless DC motor includes a rotor for providing rotational energy and a stator for supplying a magnetic field that drives the rotor. Comprising the rotor is a shaft supported by a bearing set on each end and encircled by a permanent magnet (PM) that generates a magnetic field. The stator includes a stator core with radially projecting teeth on which sets of magnet wires are wound and connected together in either a three-phase wye or Delta configuration. Each of the windings is oriented such that it lies parallel to the rotor shaft. Power devices such as MOSFETs are configured as a three-phase inverter circuit and are connected in series with each of the magnet wire windings to enable power to be selectively applied. When power is applied to a winding, the resulting current in the winding generates a magnetic field that couples to the rotor. The magnetic field associated with the PM in the rotor assembly attempts to align itself with the stator generated magnetic field resulting in rotational movement of the rotor. A control circuit sequentially activates the individual stator coils so that the PM attached to the rotor continuously chases the advancing magnetic field generated by the stator windings.

In power tool applications, the motor may be an inner-rotor motor with the rotor having a core mounted on a shaft and rotatably disposed within the stator. Alternatively, the motor may be an outer-rotor motor with the rotor having a cylindrical body that receives an inner stator therein. In some power tools such as electric nailers, outer-rotor motors may be utilized in combination with an integrated flywheel to engage a driver for driving fasteners.

The power devices are connected to the magnet wires via a terminal block, a connector, etc. In some designs, the magnet wires are wound around the stator teeth for a predetermined number of turns and axially extend out of the stator after the last turn. The magnet wires are then guided towards a terminal block, where they are connected to wires coupled to the power devices.

It was found that in this configuration, due to presents of high vibration in power tool environments, the magnet wires are prone to damage and breakage. This disclosure provides a solution to improved retention and protection of magnet wires in such power tools.

This section provides background information related to the present disclosure and is not necessarily prior art.

SUMMARY

According to an embodiment of the invention, a brushless motor is provided including a rotor rotating around a center axis and a stator including a stator core and stator teeth radially extending from the stator core forming stator slots therebetween. In an embodiment, each stator tooth including a radial main body and a tooth tip extending substantially laterally from an end of the radial main body opposite the stator core, and stator windings are wound around the stator teeth. In an embodiment, winding retention wedges are axially received within the slots, each winding retention wedge comprising: a first portion received within gaps formed between tooth tips of adjacent stator teeth, and a second portion received at least partially between adjacent stator windings to apply a force substantially in a range of a radially-inward direction to a lateral direction to the adjacent stator windings.

In an embodiment, each winding retention wedge further includes two side projections extending laterally proximate the first portion and the second portion. In an embodiment, the two side projections extend laterally between and in contact with the tooth tips of the stator and stator windings. In an embodiment, the two side projections apply forces substantially in a radial direction to the stator windings.

In an embodiment, the first portion of each winding retention wedge includes two side walls that extend substantially parallel along most of the length of the winding retention wedge. In an embodiment, the two side walls of the first portion of each winding retention wedge come together to form a triangular tip at a frontal end of the winding retention wedge for insertion into the stator slots and widen at a rear end of the upper portion.

In an embodiment, the second portion of each winding retention wedge includes two side walls each disposed substantially along a radial plane of the stator and a lower wall disposed between ends of the two side walls.

In an embodiment, the rotor is disposed outside the motor, the stator core is disposed on the center axis, and the stator teeth extend radially-outwardly from the stator core, the first portion of each winding retention wedge having an outer surface disposed substantially along an outer periphery of the stator.

According to an embodiment, a power tool is provided including a housing and a brushless motor as described above disposed within the housing.

According to an embodiment, a power tool is provided including a housing and a brushless motor disposed within the housing. In an embodiment, the brushless motor includes a rotor rotating around a center axis and a stator including a stator core disposed within the rotor along the center axis and stator teeth extending radially-outwardly from the stator core forming slots therebetween. In an embodiment, each stator tooth including a radial main body and a tooth tip extending substantially laterally from an end of the radial main body opposite the stator core. In an embodiment, stator windings are wound around the stator teeth. In an embodiment, winding retention wedges are axially received within the slots between adjacent stator windings, each winding retention wedge including a first portion engaging the tooth tips of adjacent stator teeth and a second portion received at least partially between adjacent stator windings to apply a force substantially in a range of a radially-inward direction to a lateral direction to the adjacent stator windings.

BRIEF DESCRIPTION OF THE DRAWINGS

Example embodiments of the present invention will become more fully understood from the detailed description given herein below and the accompanying drawings, wherein like elements are represented by like reference

DETAILED DESCRIPTION

Example embodiments will now be described more fully with reference to the accompanying drawings.

Figure 1:
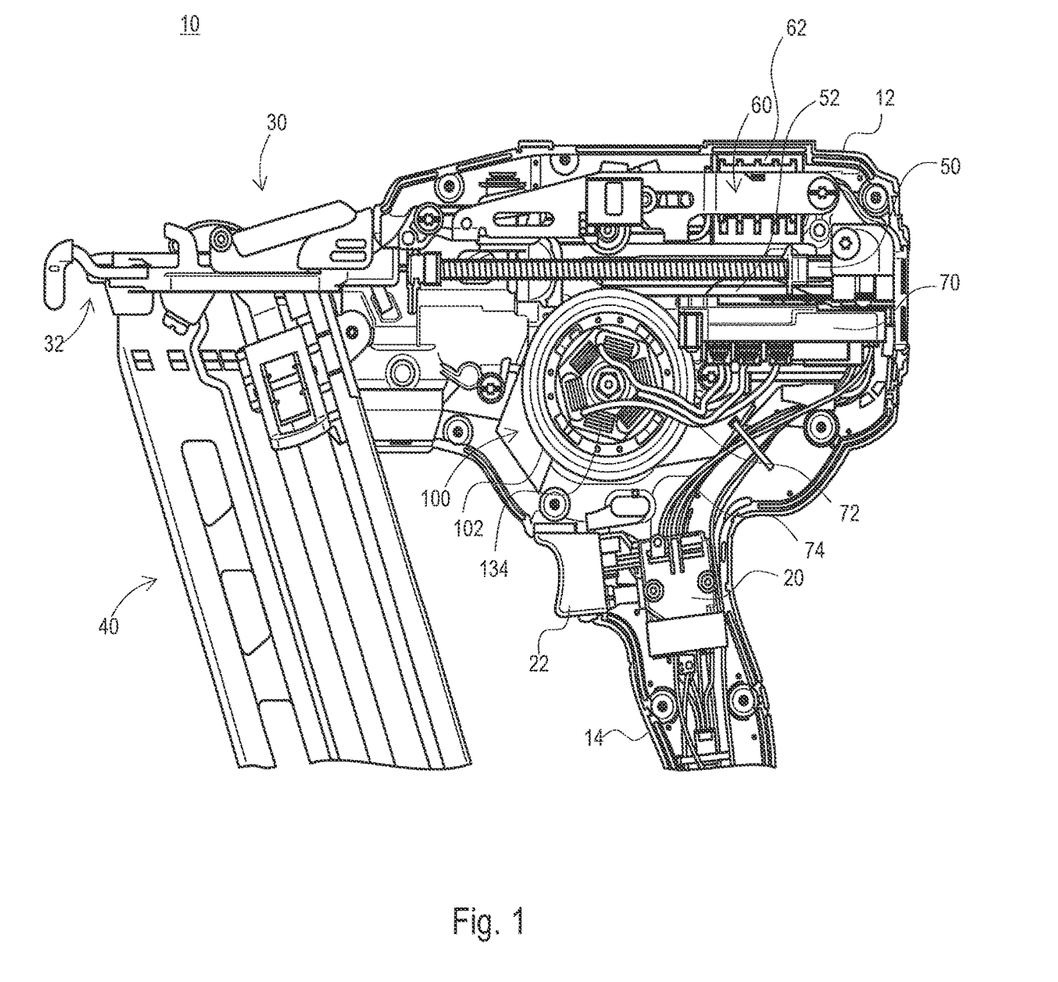
FIG. 1 depicts a side view of a fastening tool with a housing half removed, according to an embodiment.

FIG. 1 depicts a perspective view of a fastening tool 10 (e.g., a nailer) with a housing half removed, according to an embodiment. The fastening tool 10 shown herein includes an outer-rotor brushless DC motor 100. The outer rotor of the motor 100 is integrally formed with a flywheel 102. In an embodiment, the fastening tool 10 further includes a housing 12, an input unit 20 housed within a handle 14 of the housing and coupled to an actuator 22 disposed outside the housing 12, and a control unit 70.

In an embodiment, control unit 70 includes a microcontroller or other programmable control module and an inverter circuit for controlling a commutation of the motor 100. Control unit 70 is coupled to a power source (not shown), which may be a DC power source (e.g., a removable battery pack) or an AC power source (e.g., a 120V AC). Control unit 70 is also coupled to the input unit 20 via wires 74 to receive input signals indicative of actions desired by the user. The control module regulates a supply of power from the power source to the motor 100 based on a logic signal from the input unit 20. Control unit 70 is coupled to motor terminals via three lead wires 72. The inverter circuit may be, for example, a three-phase inverter circuit including three high-side solid-state switches and three low-side solid-state switches. The switching operation of the solid-state switches is controlled by the control module, which regulates supply of electric power from the power supply to the motor 100.

In an embodiment, fastening tool 10 further includes a nosepiece assembly 30 including a contract trip mechanism 32 coupled to the housing 12, a magazine assembly 40, a driver assembly 50 including a driver 52 and a return mechanism 52, an activation assembly 60, and a solenoid 62, among other components. In an embodiment, actuation of the actuator 22 while contact trip mechanism 32 is in contact with a workpiece causes the solenoid 62 to engage the activation assembly 62. Activation assembly 62 translates forward and engages the driver 52 to initiate driving engagement between the driver 52 and the flywheel 102. In an embodiment, the flywheel 102 includes one or more flywheel rings that form one or more grooves around the outer surface of the flywheel 102. The driver 52 includes corresponding railings that engage the grooves of the flywheel. Rotation of the flywheel 102 causes the driver 52 to accelerate axially and drive a fastener into a workpiece.

The present disclosure is focused on the structure and features of the motor 100. Details of the components and operation of an exemplary fastening tool are beyond the scope of this disclosure and can be found in U.S. Pat. No. 6,971,567 and US. Patent Publication No. 2012/0097729, all of which are incorporated herein by reference in their entirety. It is further noted that while the motor 100 of this disclosure is described with reference to a fastening tool according to an exemplary embodiment, motor 100 may similarly be used in other power tools and other rotary devices.

Figure 2:
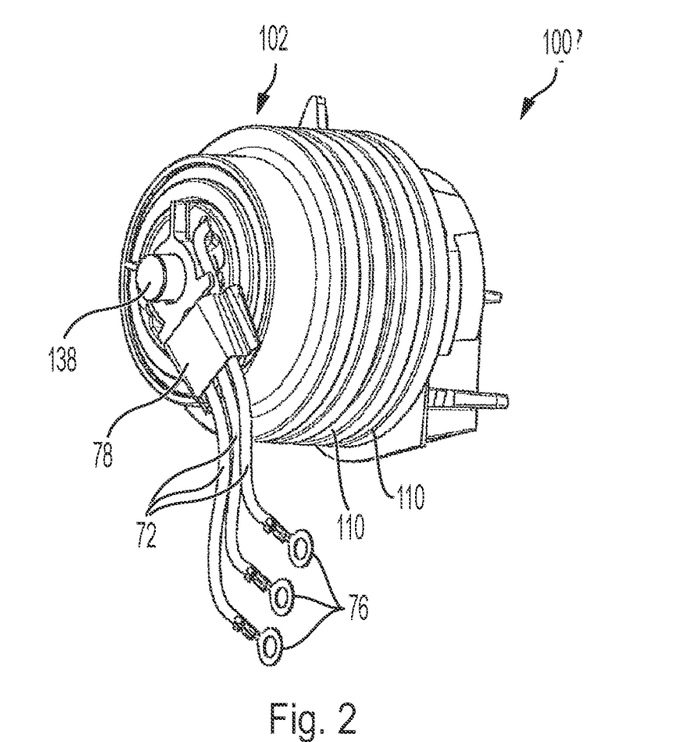
FIG. 2 depicts a perspective view of an outer-rotor BLDC motor in the fastening tool, according to an embodiment.
Figure 3:
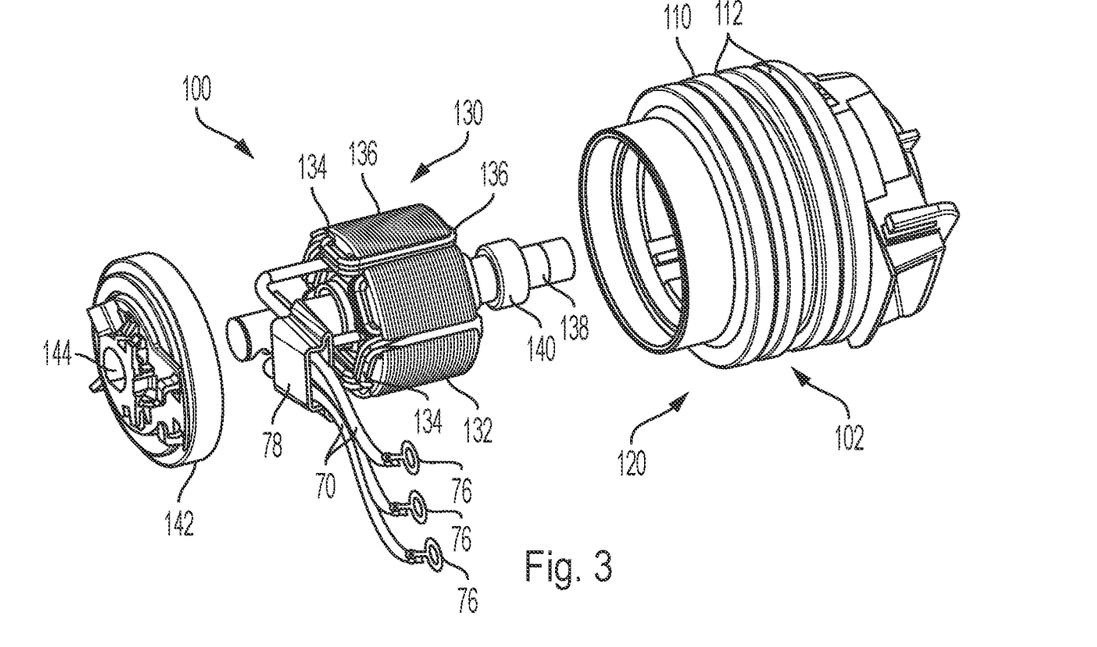
FIG. 3 depicts an exploded view of the outer-rotor BLDC motor, according to an embodiment.

FIG. 2 depicts a perspective view of outer-rotor brushless DC motor 100 in the fastening tool, according to an embodiment. FIG. 3 depicts an exploded view of outer-rotor brushless DC motor 100, according to an embodiment.

In an embodiment, motor 100 includes an outer rotor 120 and an inner stator 130.

In an embodiment, outer rotor 120 has a generally cylindrical piped-shaped body with permanent magnets (not shown) mounted on its inner surface. In an embodiment, an overmold layer may be provided to secure the magnets on the inner surface of the outer rotor 120. In an embodiment, a fan (not shown) may also be formed via the overmold layer, or separately attached to the outer rotor 120 to generate airflow with the rotation of the outer rotor 120.

In an embodiment, outer rotor 120 is provided flywheel 102 having three flywheel annular rings 110 that form grooves 112 therebetween around the outer surface of the flywheel 102. In an embodiment, flywheel 102 is formed integrally with rotor 120 on an external circumferential surface of the rotor 120 having an increased diameter compared to the remainder of the rotor 120. Alternatively, flywheel 102 may be provided as a separate part attached to an outer surface of the rotor 120. Flywheel 102 may be made of metal such as steel.

In an embodiment, stator assembly 130 includes a stator lamination stack 132 having a plurality of stator teeth projecting from an inner core, with slots formed between the stator teeth. Stator windings 134 are formed of magnet wire wound around the stator teeth to fill in the stator slots, defining the phases of the motor 100. In an embodiment, where motor 100 is a three-phase BLDC motor, three windings 134 defining the three phases of the motor 100 are disposed around the stator lamination stack 132, each winding 134 being wound on opposite two teeth across one another. In an embodiment, stator assembly 130 further includes two end insulators 136 attached to the end surfaces of the stator lamination stack 132.

In an embodiment, the stator lamination stack 132 is mounted (e.g., via press-fitting) on a shaft 138. One or more bearings 140 may be further mounted on the shaft 138, with an outer race of the bearings 140 being secured to the rotor 120 to provide axial and radial support for the stator assembly 130 with respect to the rotor 120, while allowing the rotor 120 to rotate freely about the axis of the shaft 138. In an embodiment, a bearing support member 142 is secured to the rotor 120 and includes a central pocket or through-hole 144 that receives one of the bearings 140 therein.

In an embodiment, as the stator windings 134 are energized in a controlled sequence, they create a magnetic field that interacts with the permanent magnets of the outer rotor 120, thus causing rotation of the outer rotor 120 around the stator 130.

In an embodiment, the stator windings 134 are formed of magnet wire wound around stator teeth. In an embodiment, ends of magnet wires, after stator windings 134 are fully wound, are guided out of the stator slots to form the lead wires 72 for electric coupling to the control unit 70. The ends of lead wires 72 may be provided with terminals 76 that facilitate electrical coupling to a connector on the control unit 70. In an embodiment, a guide member 78 is provided to guide the lead wires 72 coming out of the stator 130 in a radial direction.

Due to high vibration of power tools such as fastening tools, the lead wires 72 are often prone to damage and even breakage, particularly at the last turns of the magnet wires around the stator teeth. To overcome this problem, according to an embodiment, a series of winding retention wedges 200 are axially inserted within the stator slots, as described with reference to FIGS. 4-9.

Figure 4:
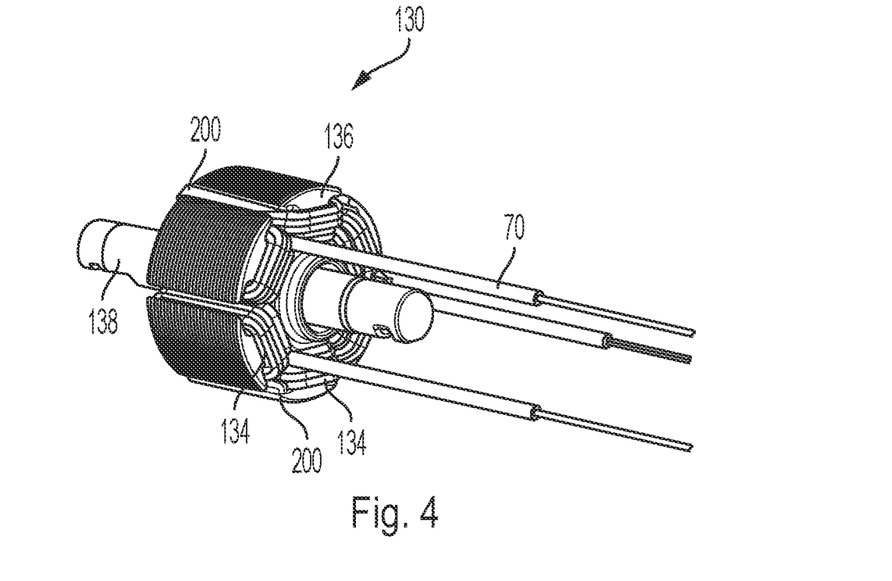
FIG. 4 depicts a perspective view of a stator for the BLDC motor including winding retention inserts, according to an embodiment.
Figure 5:
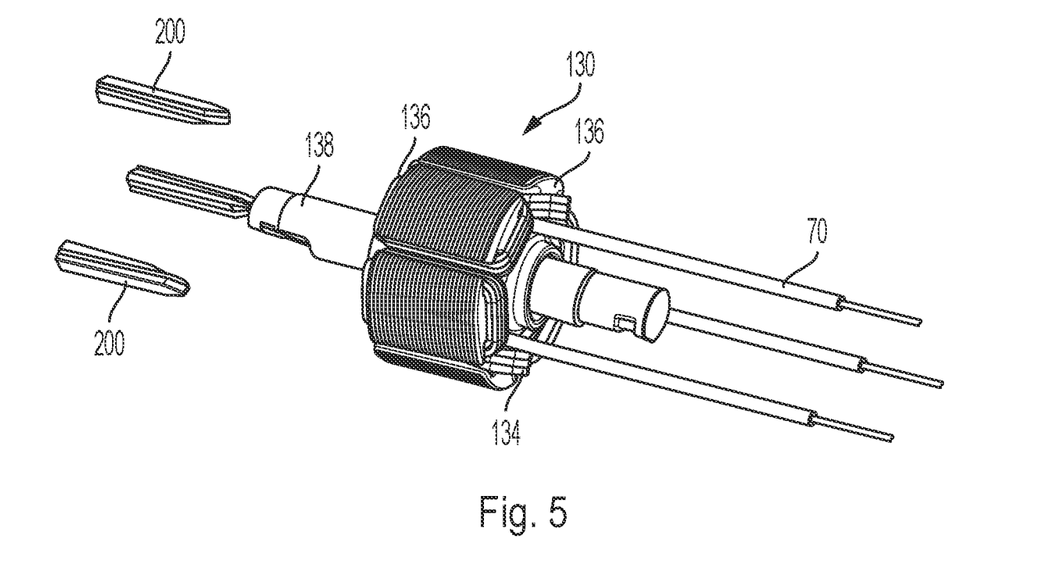
FIG. 5 depicts a partially exploded view of the stator with the winding retention inserts depicted at a distance, according to an embodiment.
Figure 6:
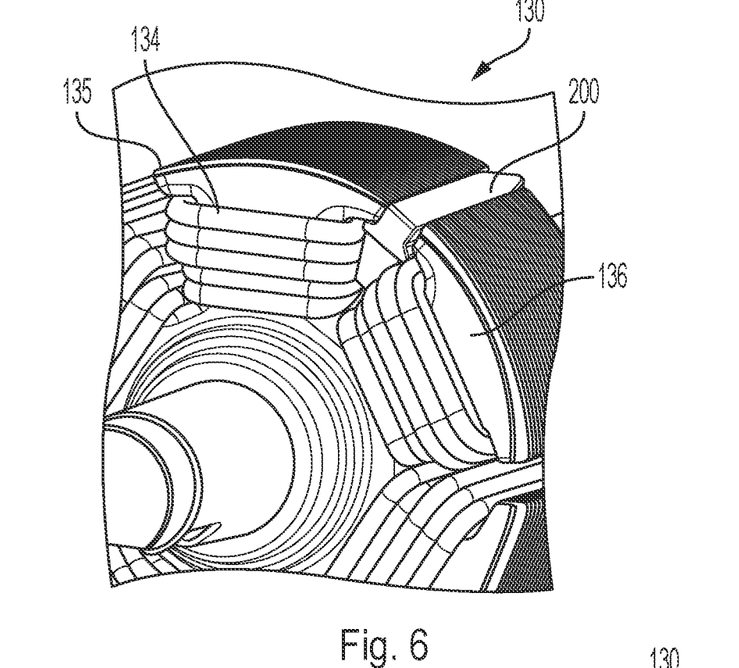
FIG. 6 depicts a partial perspective view of the stator including one winding retention insert received within a stator slot, according to an embodiment.

FIG. 4 depicts a perspective view of inner stator 130 of BLDC motor 100 including winding retention inserts 200, according to an embodiment. FIG. 5 depicts a partially exploded view of the stator 130 with the winding retention inserts at a distance from the stator 130, according to an embodiment. FIG. 6 depicts a perspective side view of the stator 130 zoomed in on one winding retention insert 200 received within a stator slot, according to an embodiment.

As shown in these figures, each winding retention insert 200 is fitted to be received within a corresponding gap of the stator 130 formed between the stator slot and the windings 134. The winding retention insert 200 is shaped to be firmly received within the gap and engage the sides of the stator windings 134, exerting a radially-inward and lateral force on the stator windings 134 within each stator slot. In this manner, the windings retention inserts 200 reduce the vibration on the stator windings 134 and prevent the lead wires 72 from breaking from the stator windings 134.

Figure 7:
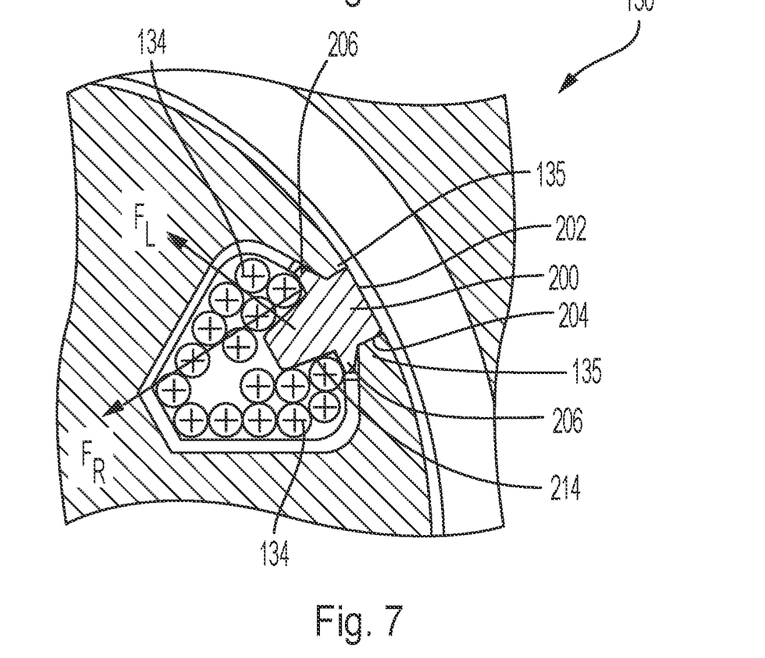
FIG. 7 depicts a zoomed-in cross-sectional axial view of the stator including the winding retention insert, according to an embodiment.
Figure 8:
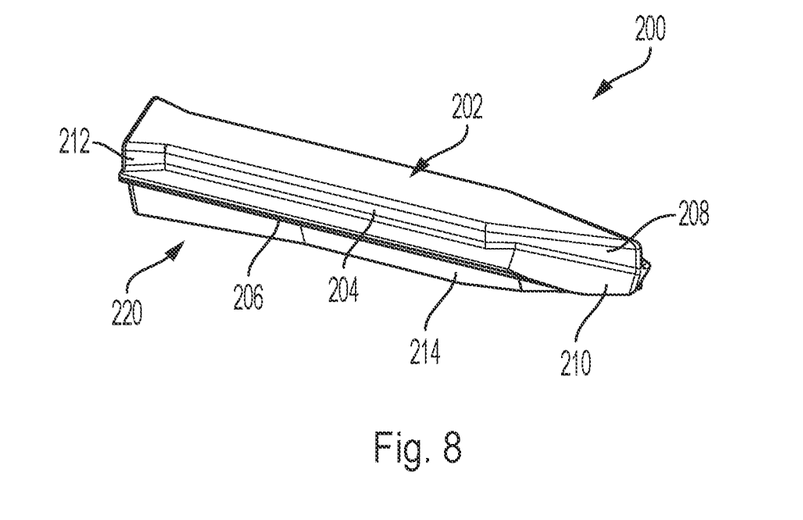
FIGS. 8 and 9 depict two perspective views of the winding retention insert, according to an embodiment.
Figure 9:
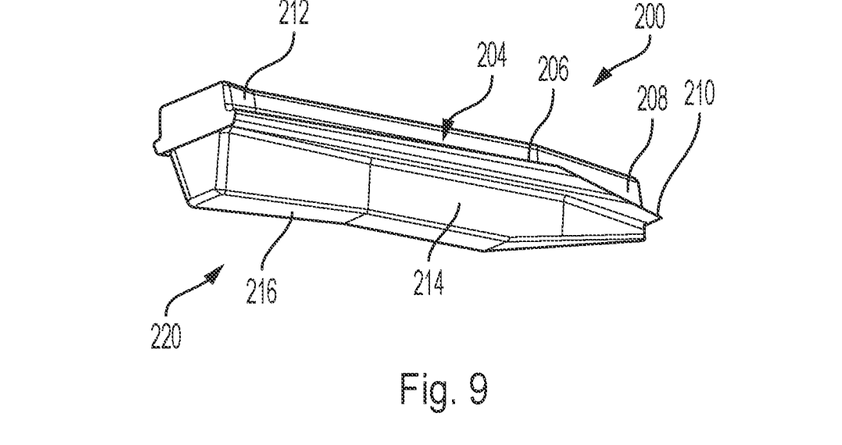

FIG. 7 depicts a zoomed-in cross-sectional axial view of the stator 130 including the winding retention insert 200, according to an embodiment. FIGS. 8 and 9 depict two perspective views of the winding retention insert, according to an embodiment.

Referring to these figures, in an embodiment, the winding retention insert 200 includes a generally-elongate body having an upper portion 202 and a lower portion 220.

In an embodiment, upper portion 202 of the winding retention insert 200 is arranged to be received in the area between tooth tips 135 of adjacent stator teeth facing one another within each stator slot. In an embodiment, upper portion 202 includes a generally rectangular cross-sectional body formed by side walls 204 that extend in parallel along most of (i.e., at least 70% of) the length of the stator lamination stack 132. At a frontal portion 208 of the upper portion 202, the side walls 204 come together, forming a triangular tip for easier insertion of the winding retention insert 200 into the stator slot. By contrast, at a rear portion 212 of the upper portion 202, the side walls 204 widen outwardly, for improved retention of the upper portion 202 between the adjacent stator tooth tips 135.

In an embodiment, lower portion 220 of the winding retention insert 200 is arranged to be received within the stator slot between adjacent stator windings 134. In an embodiment, lower portion 220 includes side walls 214 arranged at an angle in the radial direction of the stator 130. The side walls 214 are arranged to engage the stator windings 134 and apply a force laterally in direction $F_L$ away from the winding retention insert 200. Similarly to side walls 204 of the upper portion 202, side walls 214 of the lower portion 220 narrow at a front part of the lower portion 220 and widen at a rear part of the lower portion 220. A lower wall 216 further applies a radially inward force in the direction of the shaft 138 on the stator windings 134.

In an embodiment, two side projections 206 project outwardly from the winding retention insert 200 between the upper portion 202 and the lower portion 220. Side projections 206 are arranged to be received between the windings 314 and the stator tooth tips 135, applying a radially inward force in the direction $F_R$, substantially parallel to the radial direction of the shaft 138, on the stator windings 134. In an embodiment, a front portion 210 of each side projection 206 is sloped downwardly with respect to the frontal portion 208 of the upper portion 202 for ease of assembly.

In an embodiment, forces $F_L$ and $F_R$ applied by the winding retention insert 200 on the stator windings 134 compress and hold the windings 134 in within the stator slots. The winding retention insert 200 are sized according to the size of the stator slots, thickness of the magnet wires, and the number of turns of the stator windings. Once received inside the stator slots, the winding retention insert 200 stabilize and protect the stator windings 134 against vibration. Winding retention insert 200 particularly protect the lead wires 72 from damage and breakage at the last turns of the magnet wires around the stator teeth.

In an embodiment, where the motor is a three-phase motor having six stator teeth, three winding retention inserts 200 are provided within stator teeth. Thus, the total number of winding retention inserts 200 corresponds to half the total number of stator teeth.

In an embodiment, side walls 214 and/or lower wall 216 may be provided with a layer of conforming material. In an embodiment, the entirety of the winding retention insert 200 may be made of conforming material. Alternatively, side walls 214 and/or lower wall 216 may be made of conforming material. In yet another embodiment, a layer of conforming material may be overmolded over the side walls 214 and/or lower wall 216. The conforming material comes in contact with the stator windings 134 and deformingly conforms to the shape of the windings 134, ensuring that any gap between the winding retention insert 200 and the stator windings 134 is filled. The conforming material in this manner ensures substantially consistent application of forces $F_L$ and/or $F_R$ by the winding retention insert 200 on the stator windings 134, even with minor variations in the size of the gap between the stator windings 134.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "bottom," "lower," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention claimed is:

1. A brushless motor comprising:
   a rotor rotating around a center axis;
   a stator including a stator core and a plurality of stator teeth radially extending from the stator core forming a plurality of slots therebetween, each stator tooth including a radial main body and a tooth tip extending substantially laterally from an end of the radial main body opposite the stator core;
   a plurality of stator windings wound around the plurality of stator teeth; and
   a plurality of winding retention wedges axially received within the plurality of slots, each winding retention wedge comprising: a first portion received within gaps formed between tooth tips of adjacent stator teeth, and a second portion received at least partially between adjacent stator windings to apply a first force substantially in a radially-inward direction and a second force substantially in a lateral direction to the adjacent stator windings,
   wherein the first portion of each winding retention wedge includes two side walls that extend substantially parallel along most of the length of the winding retention wedge, the two side walls coming together at a frontal end of the winding retention wedge for insertion into the stator slots and widening at a rear end of the winding retention wedge.

2. The brushless motor of claim 1, wherein each winding retention wedge further comprises two side projections extending laterally proximate the first portion and the second portion.

3. The brushless motor of claim 2, wherein the two side projections extend laterally between and in contact with the tooth tips of the stator and stator windings.

4. The brushless motor of claim 3, wherein the two side projections include lower surfaces that apply forces substantially in a radial direction to the stator windings.

5. The brushless motor of claim 1, wherein the second portion of each winding retention wedge includes two side walls each disposed substantially along a radial plane of the stator and a lower wall disposed between ends of the two side walls.

6. The brushless motor of claim 1, wherein the rotor is disposed outside the motor, the stator core is disposed on the center axis, and the plurality of stator teeth extend radially-outwardly from the stator core, the first portion of each winding retention wedge having an outer surface disposed substantially along an outer periphery of the stator.

7. A power tool comprising a housing and a brushless motor disposed within the housing, the brushless motor comprising:
   a rotor rotating around a center axis;
   a stator including a stator core and a plurality of stator teeth radially extending from the stator core forming a plurality of slots therebetween, each stator tooth including a radial main body and a tooth tip extending substantially laterally from an end of the radial main body opposite the stator core;
   a plurality of stator windings wound around the plurality of stator teeth; and
   a plurality of winding retention wedges axially received within the plurality of slots, each winding retention wedge comprising: a first portion received within gaps formed between tooth tips of adjacent stator teeth, and a second portion received at least partially between adjacent stator windings to apply a first force substantially in a radially-inward direction and a second force substantially in a lateral direction to the adjacent stator windings,
   wherein the first portion of each winding retention wedge includes two side walls that extend substantially parallel along most of the length of the winding retention wedge, the two side walls coming together at a frontal end of the winding retention wedge for insertion into the stator slots and widening at a rear end of the winding retention wedge.

8. The power tool of claim 7, wherein each winding retention wedge further comprises two side projections extending laterally proximate the first portion and the second portion.

9. The power tool of claim 8, wherein the two side projections extend laterally between and in contact with the tooth tips of the stator and stator windings, and the two side projections apply forces substantially in a radial direction to the stator windings.

10. The power tool of claim 7, wherein the second portion of each winding retention wedge includes two side walls each disposed substantially along a radial plane of the stator and a lower wall disposed between ends of the two side walls.

11. The power tool of claim 7, wherein the rotor is disposed outside the motor, the stator core is disposed on the center axis, and the plurality of stator teeth extend radially-outwardly from the stator core, the first portion of each winding retention wedge having an outer surface disposed substantially along an outer periphery of the stator.

12. A power tool comprising a housing and a brushless motor disposed within the housing, the brushless motor comprising:
   a rotor rotating around a center axis;
   a stator including a stator core disposed within the rotor along the center axis and a plurality of stator teeth extending radially-outwardly from the stator core forming a plurality of slots therebetween, each stator tooth including a radial main body and a tooth tip extending substantially laterally from an end of the radial main body opposite the stator core;
   a plurality of stator windings wound around the plurality of stator teeth; and
   a plurality of winding retention wedges axially received within the plurality of slots between adjacent stator windings, each winding retention wedge comprising a first portion engaging the tooth tips of adjacent stator teeth and a second portion received at least partially between adjacent stator windings to apply a first force substantially in a radially-inward direction and a second force substantially in a lateral direction to the adjacent stator windings,
   wherein the first portion of each winding retention wedge includes: two side walls that extend substantially in parallel and in contact with tooth tips of adjacent stator teeth, and an outer surface that extends between the two side walls and is circumferentially aligned with outer surfaces of the tooth tips.

13. The power tool of claim 12, wherein each winding retention wedge further comprises two side projections extending laterally proximate the first portion and the second portion.

14. The power tool of claim 13, wherein the two side projections extend laterally between and in contact with the tooth tips of the stator and stator windings, and the two side projections apply forces substantially in a radial direction to the stator windings.

15. The power tool of claim 12, wherein the first portion of each winding retention wedge includes two side walls that extend substantially parallel along most of the length of the winding retention wedge, wherein the two side walls of the first portion of each winding retention wedge come together at a frontal end of the winding retention wedge and widen at a rear end of the winding retention wedge.

16. The power tool of claim 12, wherein the second portion of each winding retention wedge includes two side walls each disposed substantially along a radial plane of the stator and a lower wall disposed between ends of the two side walls.

17. The power tool of claim 12, wherein the rotor is disposed outside the motor, the stator core is disposed on the center axis, and the plurality of stator teeth extend radially-outwardly from the stator core, the first portion of each winding retention wedge having an outer surface disposed substantially along an outer periphery of the stator.

* * * * *